United States Patent [19]

Nagasawa et al.

[11] Patent Number: 5,121,114
[45] Date of Patent: Jun. 9, 1992

[54] INFORMATION PROCESSING APPARATUS HAVING A SPECIFIED-AREA CONFIRMING FUNCTION

[75] Inventors: Hiroyuki Nagasawa, Kitakatsuragi; Kazuhiko Matsuo, Yamatokoriyama; Masanobu Watanabe, Nara, all of Japan

[73] Assignee: Sharp Corporation, Osaka, Japan

[21] Appl. No.: 529,873

[22] Filed: May 29, 1990

[30] Foreign Application Priority Data

May 29, 1989 [JP] Japan .................... 1-136481
Jun. 21, 1989 [JP] Japan .................... 1-160413

[51] Int. Cl.⁵ ............................................ G09G 1/06
[52] U.S. Cl. ................................. 340/721; 340/726
[58] Field of Search .............. 340/721, 724, 726, 723, 340/709, 706

[56] References Cited

U.S. PATENT DOCUMENTS

| | | | |
|---|---|---|---|
| 4,057,849 | 11/1977 | Ying et al. ........................... | 364/200 |
| 4,506,343 | 3/1985 | Shipp, Jr. et al. .................. | 340/721 |
| 4,931,987 | 6/1990 | Kawakami .......................... | 340/724 |
| 4,947,370 | 8/1990 | Sugitani .............................. | 340/724 |

FOREIGN PATENT DOCUMENTS 58-2878  1/1983  Japan .

OTHER PUBLICATIONS

IBM Technical Disclosure Bulletin, vol. 28, No. 2, Jul. 1985, p. 856, New York, U.S.; "Method to Dynamically Adjust a Scrolling Unit".

Primary Examiner—Ulysses Weldon
Assistant Examiner—Xiao Min Wu
Attorney, Agent, or Firm—David G. Conlin; Robert F. O'Connell

[57] ABSTRACT

An information processing apparatus having a specified-area confirming function comprises a keyboard for inputting information and marking the beginning and end points of a desired area in the information to specify the area; an inputted information memory for storing the information inputted from the keyboard; a display having a screen for displaying on the screen the information stored in the inputted information memory; first line information memory for storing information in the first line of the area when the area is specified by the keyboard; and a processing unit for allocating a fixed screen to a predetermined position on the screen of the display when the area is specified by the keyboard and for reading the information in the first line from the first line information memory and displaying it within the fixed screen.

2 Claims, 7 Drawing Sheets

INFORMATION PROCESSING APPARATUS HAVING A SPECIFIED-AREA CONFIRMING FUNCTION

BACKGROUND OF THE INVENTION

1. Field of the Invention

The present invention relates to an information processing apparatus, such as a text processing apparatus, capable of inputting/outputting various information and editing text in various ways by specifying an area of the information.

2. Description of the Prior Art

Conventionally, this type of text processing apparatus generally has an edit function of indicating an area to specify it as an editing unit. Specifying the area is usually performed by indicating two characters in text displayed on a screen. Specifically, a cursor is moved to a character at the head of the area and then an area indicating key is depressed to mark the beginning of the area. Then, the cursor is moved to a final character of the area and then the area indicating key is depressed again to mark the end of the area.

Figure 7A:
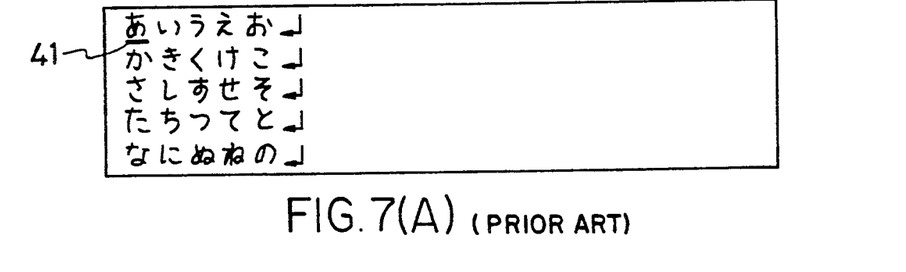
Figure 7B:
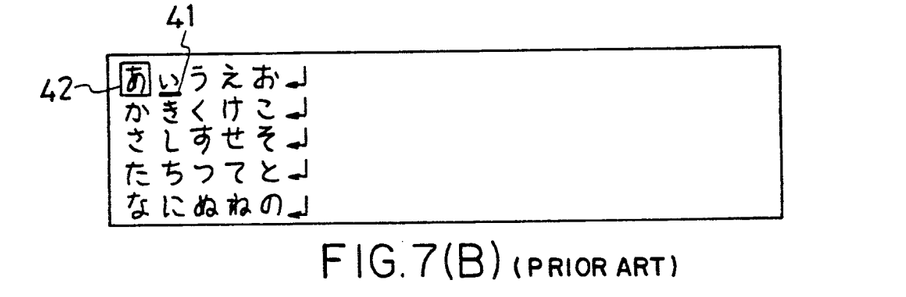
Figure 7C:
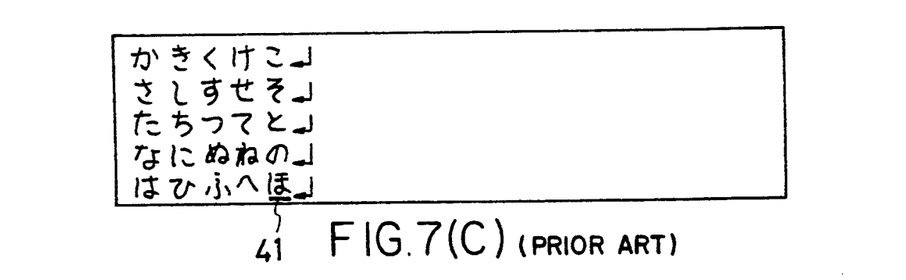
Figure 7D:
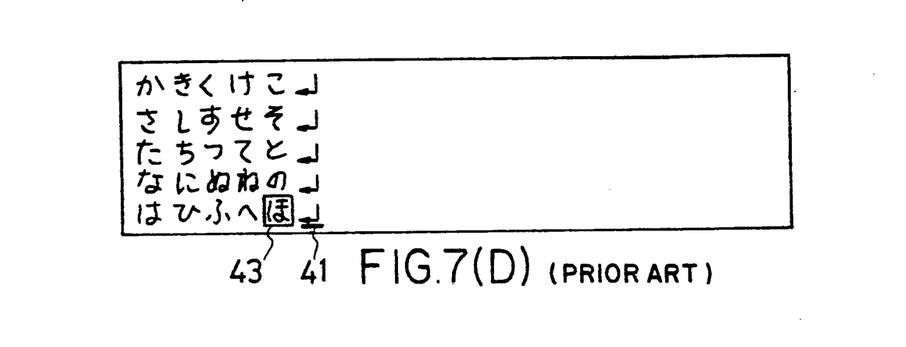

More specifically, as shown in an exemplary screen display in FIG. 7, one end of a desired area is indicated by a cursor 41 (see FIG. 7(A)) to mark the beginning of the area with an area beginning point marker 42 (see FIG. 7(B)), and thereafter, the cursor 41 is moved to the other end of the area on a screen (see FIG. 7(C)) to mark the end of the area with an area end point marker 43 (FIG. 7(D)). In this way, the area to be specified is marked so that text in the marked area can be edited through various processes, such as move it, or delete it.

However, with a text processing apparatus having a small screen, in the case of specifying a large area in text, as a cursor is moved to the end of the area after marking the beginning of the area, the screen is often automatically scrolled, and this causes the beginning of the area to disappear from the screen, as shown in FIG. 7 (A) to (D). Thus, when the beginning of the area disappears from the screen, the position of the beginning of the area cannot be confirmed, and there arises the problem that it cannot be recognized how large the area is specified. To confirm the beginning of the area, the screen must be scrolled in the reverse direction to search for the position where the beginning of the area is marked, and this is a time consuming work.

As a related art, a document processing device is known, which is provided with a plurality of display control circuits, a display screen displaying a plurality of images independently and a changeover means on a keyboard for selectively instructing the display control circuits to execute an image processing (see Unexamined Japanese Patent Publication No. 2878/1983).

SUMMARY OF THE INVENTION

The present invention overcomes the above-mentioned disadvantages of the prior art embodiments and provides an information processing apparatus having a specified-area confirming function in which the first line corresponding to the beginning of a specified-area is always displayed on a screen.

An information processing apparatus having a specified-area confirming function according to the present invention comprises input means for inputting information and marking the beginning and end points of a desired area in the information to specify the area, inputted information storing means for storing the information inputted from the input means, display means having a screen for displaying on the screen the information stored in the inputted information storing means, first line information storing means for storing information in the first line of the area when the area is specified by the input means, screen dividing means for allocating a fixed screen to a predetermined position on the screen of the display means when the area is specified by the input means, and first line display means for reading the information in the first line from the first line information storing means and displaying it within the fixed screen.

Preferably, the information processing apparatus further comprises beginning position storing means for storing the beginning position of the area specified by the input means with regard to the information displayed on the screen of the display means, scroll means for scrolling the screen of the display means when instructed from the input means, and screen division control means for controlling the screen dividing means so that the fixed screen is allocated to the predetermined position on the screen by the screen dividing means when the beginning position of the area stored in the beginning position storing means disappears from the screen of the display means due to a scroll by the scroll means.

In accordance with the information processing apparatus having a structure as stated above according to the present invention, when the cursor is moved to a character corresponding to the beginning of information in an area to be edited in the information inputted and displayed on the screen and instructions to specify the area are given from the input means, a piece of information in the first line in the information in the specified area is stored in the first line information storing means while a fixed screen is allocated to a predetermined position of the display means. As the fixed screen is allocated to the display means, the information in the first line is read from the first line information storing means and displayed within the fixed screen.

In accordance with the information processing device further comprising the beginning position storing means, the scroll means and the screen division control means, the screen of the display means is scrolled by the scroll means, and when the beginning position of the area stored in the beginning position storing means disappears from the screen of the display means due to a scroll by the scroll means, a fixed screen is allocated to a predetermined position of the display means, and the information in the first line is read from the first line information storing means and displayed within the fixed screen.

Thus, when the beginning of the area is indicated, the fixed screen by screen division is not allocated onto the screen, and thereafter, the screen is scrolled. When the beginning of the area disappears from the screen, the fixed screen is allocated to display the beginning of the area. Hence, even when the end point of the area is indicated, a range of the area can be sufficiently confirmed.

BRIEF DESCRIPTION OF THE DRAWINGS

FIG. 3 (A) to (D) are diagrams showing a display state of a first line display process in the first embodiment;

FIG. 5 (A) to (D) are diagrams showing an exemplary screen division display in the second embodiment;

FIG. 7 (A) to (D) are diagrams showing a display state of a conventional area specifying process.

DESCRIPTION OF THE PREFERRED EMBODIMENT

In the present invention, a train of words in the first line preferably corresponds to a single line. A fixed screen is independently provided on a display screen not to be scrolled.

Input means in the present invention may be that which can input various information and specify an area of the inputted information by marking the beginning and end of the area; for example, a keyboard device, a tablet device and the like are used.

Display means may be that which has a screen capable of displaying one or more lines of various information and display on the screen the various information stored in the input information storing means, and it generally includes a display buffer composed of a RAM and a display controller composed of a microprocessor; for example, it may be a dot matrix type display device such as a CRT display device, an LC (liquid crystal) display device, an EL display device or the like. The first line information storing means is composed of a RAM, and specifically, it may be a character buffer.

Input information storing means may be that which can store various information inputted from the input means, while beginning position storing means may be that which can store the beginning position of the specified area on the information displayed on the screen of the display means; as the input information storing means and the beginning position storing means, mainly RAMs such as a core memory of and IC memory are used.

As screen dividing means, first line display means, scroll means and screen division control means, generally microprocessors are conveniently used.

The present invention will now be described on the basis of embodiments shown in the drawings in detail. The present invention is not limited to the description herein.

Figure 1:
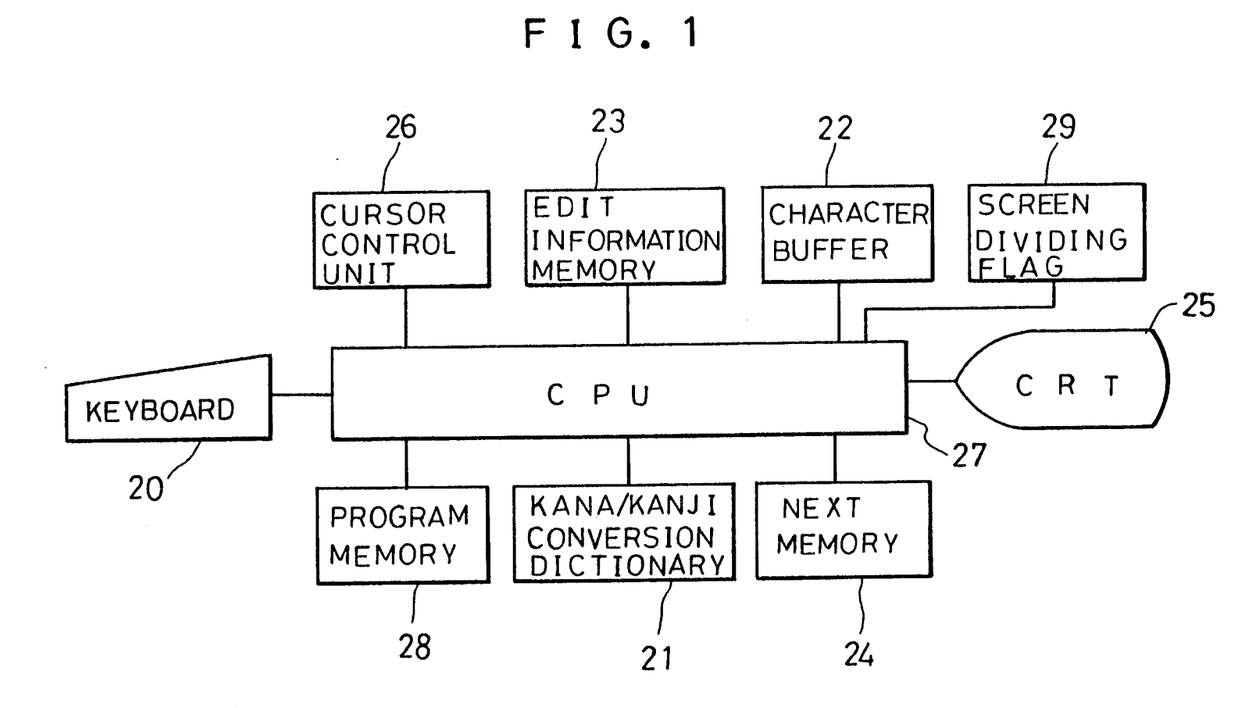
FIG. 1 is a block diagram showing a structure of a Japanese word processor of a first embodiment according to the present invention.

FIG. 1 is a block diagram showing a structure of a Japanese word processor of a first embodiment according to the present invention. In FIG. 1, a keyboard 20 includes character input keys for inputting a character train to be kana (Japanese alphabet)/kanji (Chinese character) converted, a conversion key for executing a kana/kanji conversion, a cursor move key for moving a cursor, an area specifying key for specifying an area, an execution key for executing various processes and the like.

A kana/kanji conversion dictionary 21 stores many words (kana, kanji) corresponding to a character train. A character buffer 22 stores a word train in the first line of an area specified by the area specifying key. An edit information memory 23 composed of a ROM stores edition setting contents inputted from the keyboard 20, that is, edit information such as a pitch between lines and a pitch between characters. A text memory 24 stores text inputted from the keyboard 20 and fixed through a conversion. A CRT 25 displays on a screen various information such as a character train of kana and words decided to be inputted so that the information can be scrolled. A cursor control unit 26 moves a cursor to the beginning and end points of an area to specify the area by manipulating cursor move keys on the keyboard 20.

A CPU 27 executes a kana/kanji conversion and a first line display process stated below, in accordance with a control program written in a program memory 28. Specifically, in an ordinary kana/kanji conversion, kana/kanji corresponding to a character train inputted from the keyboard 20 are read from the kana/kanji conversion dictionary 21. In a first line display process which is a characteristic of the first embodiment, a procedure mentioned below is performed; that is, at least one or more characters are indicated in text displayed by the CRT 25 to specify an area of the text. When the area is specified, a word train in the first line of the area is stored in the character buffer 22. At the same time, a fixed screen (a screen not to be scrolled) is allocated to a predetermined position of the screen. When the fixed screen is allocated, a word train in the first line is read from the character buffer 22 to display within the fixed screen.

A screen dividing flag 29 is set "OFF" in an ordinary character input mode, while set "ON" when the fixed screen is allocated onto the screen of the CRT 25.

Figure 2:
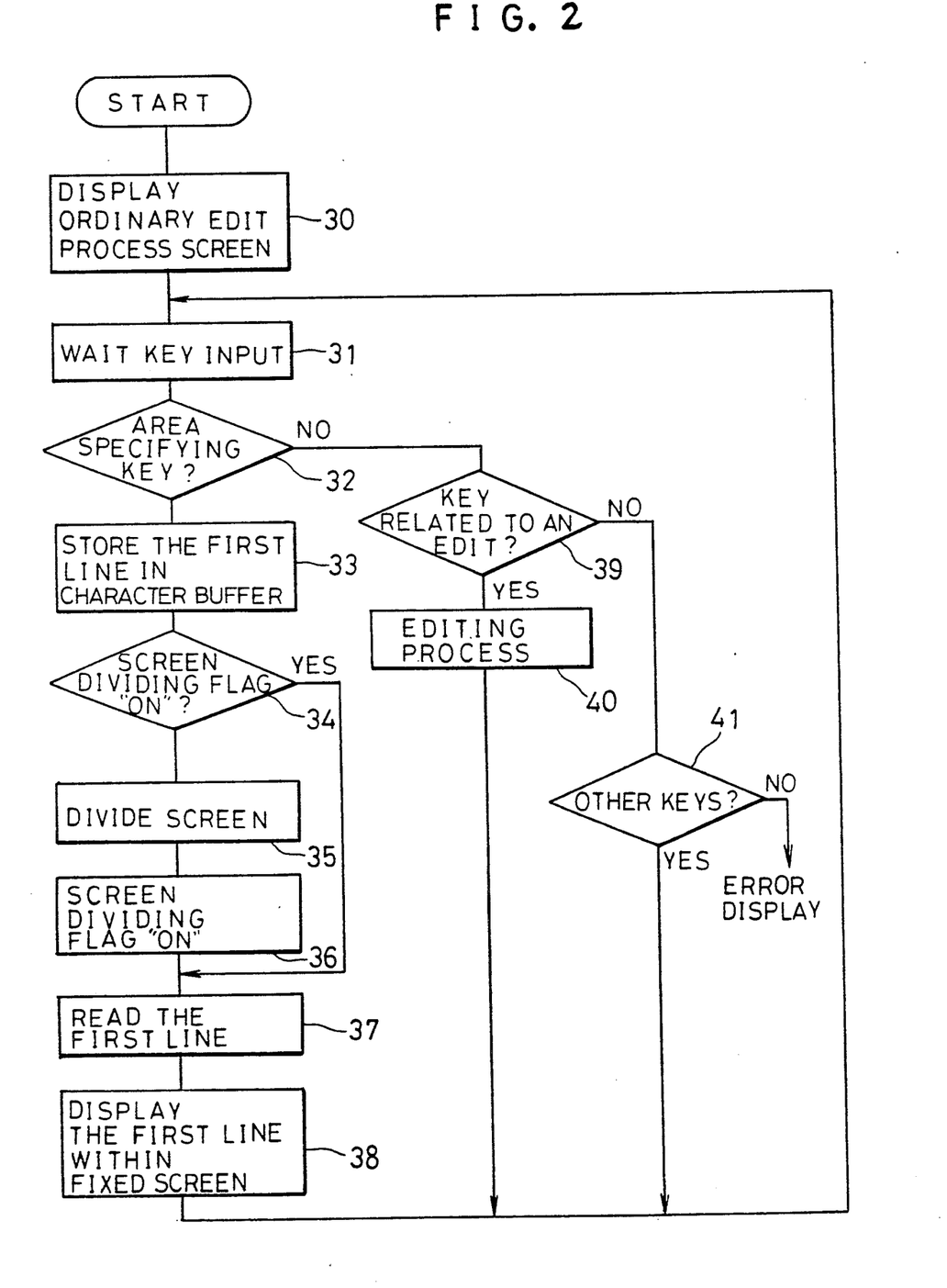
FIG. 2 is a flow chart for explaining the operation of the first embodiment.

Now, the first line display process will be described in accordance with a flow chart shown in FIG. 2, on the premise that an ordinary process screen (character input mode) is invoked on the screen of the CRT 25.

When an ordinary edit process screen is displayed (step 30), a key input is waited (step 31). At this time, the cursor is moved to the head of an area to be edited and the area specifying key is depressed (step 32) to store an initial single line in the specified area in the character buffer 22 (step 33). Then it is judged whether or not the screen dividing flag is set "ON" (step 34). If the result of the judgment is NO, that is, if the fixed screen does not break onto the screen, a fixed screen corresponding to a single line of the text breaks onto the screen (step 35), the screen dividing flag is set "ON" (step 36), the first line is read from the character buffer 22 (step 37) and then the read first line is displayed within the fixed screen breaking onto the screen (step 38). As a result, the text displayed on the ordinary edit process screen is moved to a screen below the fixed screen and displayed. In other words, the line corresponding to the head of the area is displayed in two positions on the screen.

If the depressed key is not the area specifying key at step 32, it is judged whether or not a key related to edit such as a return key or a space key has been depressed (step 39). If the depressed key is the area specifying key, an edit process corresponding to the key related to edit is executed (step 40) and the processing is returned to step 31. If a negative result is produced at step 39, it is judged whether or not another key has been depressed (step 41). If a positive result is produced, the processing is returned to step 31, but if a negative result is produced, an error indication is displayed.

Figure 3A:
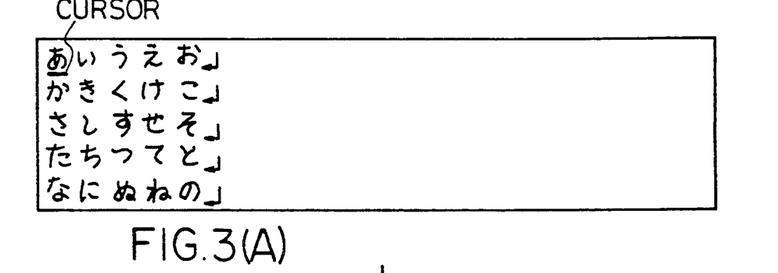
Figure 3B:
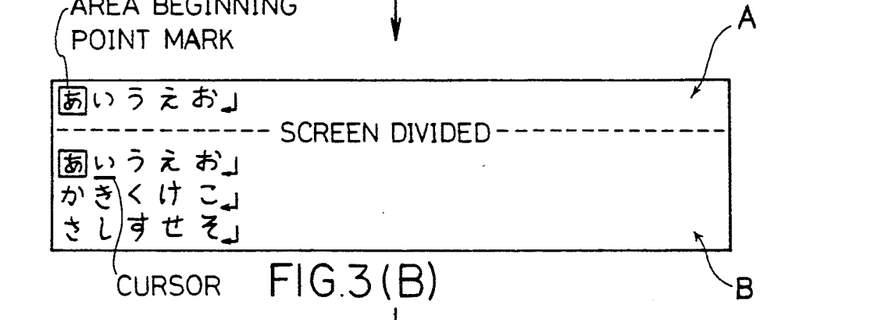
Figure 3C:
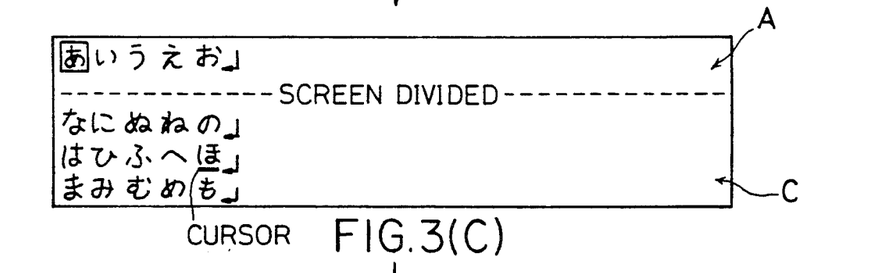
Figure 3D:
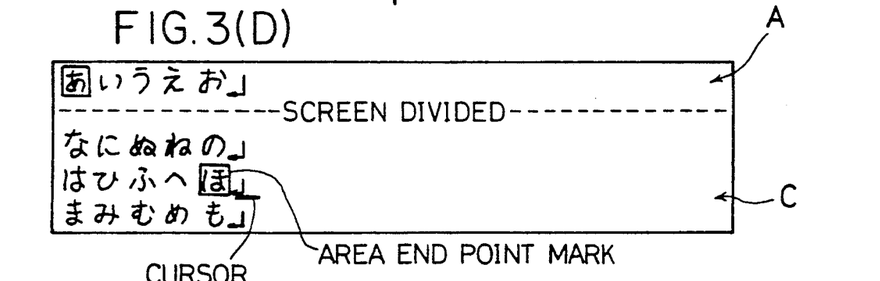

FIG. 3(A) shows a display state when the cursor is positioned at the head of the area. Fig. 3(B) shows a state in which the screen of the CRT 25 is divided into a fixed screen A and a screen B which can be scrolled, by depressing the area specifying key. FIG. 3(C) shows a state in which the cursor is moved across more than one lines to invoke a screen C and the cursor is positioned in the end of the area. FIG. 3(D) shows a state in which the area specifying key is depressed to indicate the end point of the area. In this way, even if a range of the specified area covers more than one lines and the screen is scrolled, the first line of the area to be specified always appears on the fixed screen A.

In this way, whenever the beginning point of the specified area is marked, the first line in which the beginning point of the area exists is displayed within the divided, fixed screen, whereby even if the specified area covers more than one lines, the first line of the area can be confirmed on the same screen. Thus, the specified area can be accurately recognized, and whereby an area specification can be accurately performed.

Then, a second embodiment according to the present invention will be described in detail with reference to FIGS. 4 to 6.

In the second embodiment, unlike the first embodiment, only when the beginning point of an area is indicated and thereafter the beginning point of the area disappears from a screen due to a screen scroll, the screen is divided into two, a fixed screen is allocated to a predetermined position on the screen and information in the first line is displayed therein.

Figure 4:
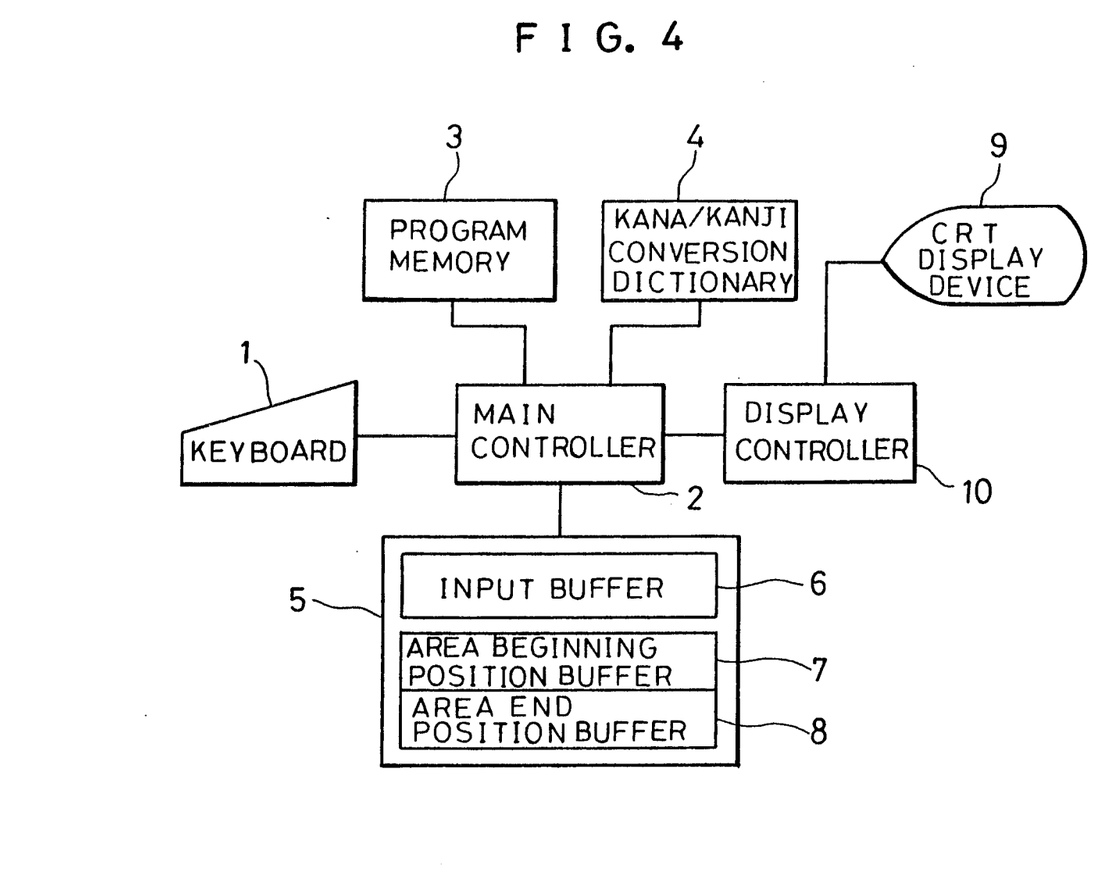
FIG. 4 is a block diagram showing a structure of a Japanese word processor of a second embodiment according to the present invention.

FIG. 4 is a block diagram showing a structure of a Japanese word processor of the second embodiment according to the present invention.

In FIG. 4, a keyboard 1 includes a kana key, a kana/kanji conversion key, a cursor move key for moving a cursor, an area specifying key for specifying an area and the like, and it is used for inputting pronunciation information on the basis of kana and an instruction to specify an area, to a main controller 2.

A main controller 2 is composed of a microprocessor, and executes various data processes stated below in accordance with a program stored in a program memory composed of a ROM.

A kana/kanji conversion dictionary composed of an inner memory such as a ROM, or an external memory such as a floppy disc or a magnetic disc stores many words including kanji along with their pronunciation information on the basis of kana.

A RAM 5 is provided with an input buffer 6, an area beginning point buffer 7 and an area end position buffer 8 therein.

An input buffer 6 stores data inputted from the keyboard 1, that is, a kana-character train, a kanji-kana combined phrase which is converted from the kana-character train by the kana/kanji conversion dictionary, and the like.

A CRT display device 9 can display various data.

A display controller 10 is composed of a display buffer including a RAM and a microprocessor, and it converts data stored in the input buffer 6, a cursor for giving instruction on an input position, the beginning point and end point marks of an area specified with the cursor and the like into a display image to display on a screen of a CRT display device 9.

The area beginning point buffer 7 of the RAM 5 stores the beginning point of the specified area with respect to the data displayed on the screen of the CRT display device 9 with its coordinates, while the area end point position buffer 8 stores the end point of the area with its coordinates.

The main controller 2 makes the input buffer 6 store the data inputted from the keyboard 1, and when the keyboard 1 gives instructions of a kana/kanji conversion, it converts a kana-character train into a kanji and kana combined phrase through the kana/kanji conversion dictionary 4.

Data which can be displayed on the screen of the CRT display device 9 in the data stored in the input buffer 6 is extracted to be conveyed to the display controller 10.

The beginning point of an area including data displayed on the screen of the CRT display device 9 is located by a manipulation of the cursor move key on the keyboard 1, and when the area specifying key determines the position where the cursor currently lies as the beginning point of the area, the display controller 10 is controlled to mark the beginning point of the area in the cursor position on the screen of the CRT display device 9, and the position is stored in the area beginning point buffer 7 of the RAM 5.

Similar to the above, when the area specifying key determined the position where the cursor currently lies as the end point of the area, the end point of the area is marked in the cursor position on the screen of the CRT display device 9, and the position is stored in the area end point buffer 8 of the RAM 5.

Furthermore, the main controller 2, when it receives instructions to scroll the screen of the CRt display device 9, that is, when the cursor is moved outward from a screen frame of the CRT display device 9 by the cursor move key on the keyboard 1, controls the display controller 10 to scroll the entire screen in the reverse direction to the direction of the move of the cursor.

It is always judged whether or not the beginning point of the area stored in the area beginning buffer 7 lies within the screen of the CRT display device 9. When the beginning point of the area stored in the area beginning point buffer 7 disappears from the screen of the CRT display device 9 due to the above-mentioned screen scroll, the screen of the CRT display device 9 is divided into two through a control of the display controller 10. On one of the divided screens, the beginning point of the area is kept displayed, while the other of the divided screens alone is scrolled.

FIGS. 5 (A) to (D) is a diagram showning an exemplary display when the screen of the CRT display device 9 is divided.

As shown in FIG. 5 (A), when a kana-character train, for example, is stored in the input buffer 6, the kana-character train is displayed on the screen of the CRT display device 9, and a cursor 11 is displayed.

Figure 5A:
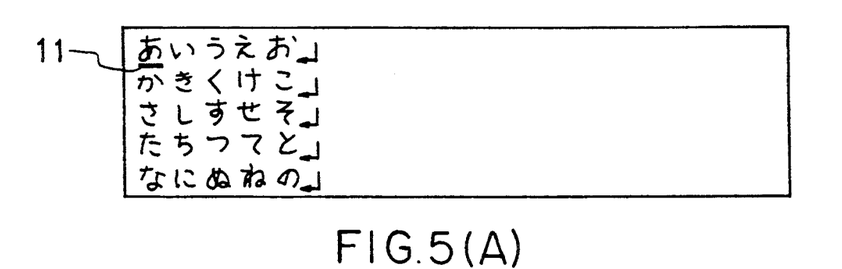
Figure 5B:
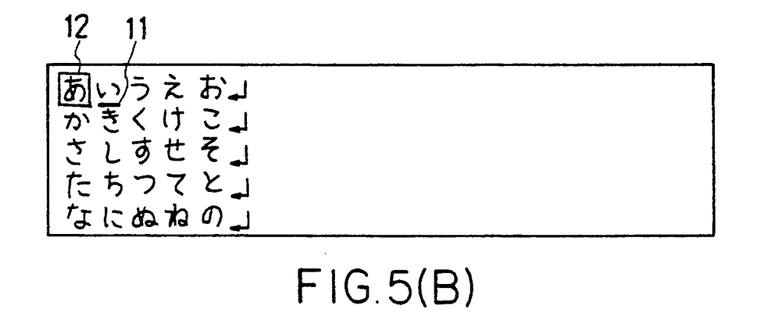
Figure 6:
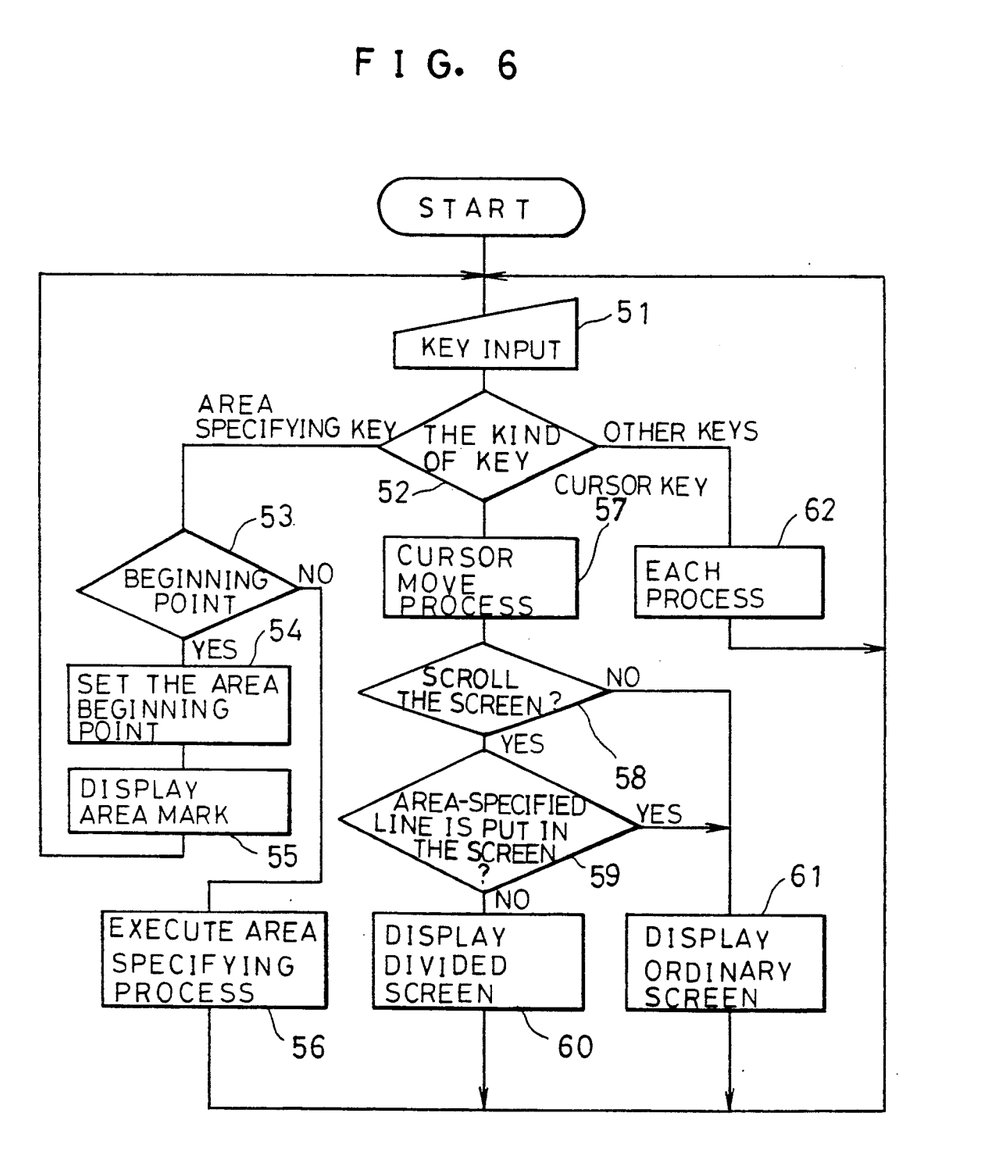
FIG. 6 is a flow chart showing the operation of the second embodiment.

In this state, when the area specifying key is depressed, as shown in FIG. 5(B), an area beginning point 12 is marked in a position where the cursor 11 currently lies, and the cursor 11 moves to the right by a single column.

Figure 5C:
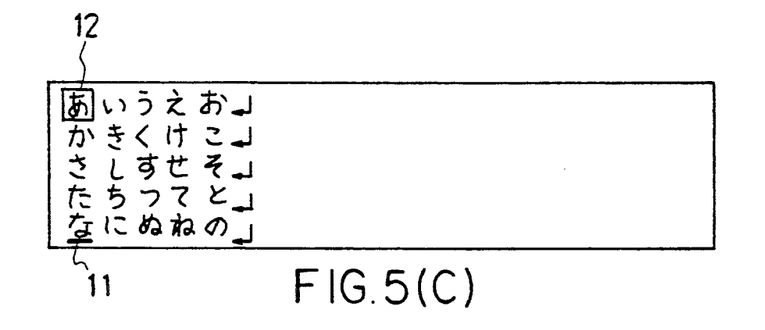
Figure 5D:
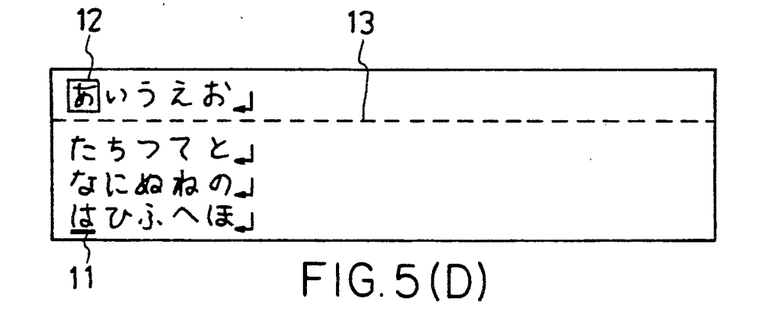

As shown in FIG. 5(C), when the cursor key is manipulated several times to move the cursor 11 to the lower part in the figure, the cursor 11 moves downward. Furthermore, when the manipulation is continued until a line where the area beginning point is marked disappears, as shown in FIG. 5(D), a screen boundary 13 is created to divide the screen into two; the upper screen is that which has a fixed display of the line marked with the area beginning point 12, while the lower screen alone is scrolled.

Then, the processing operation of the main controller 2 will be explained in conjunction with a flow chart in FIG. 6.

In this process, the input buffer 6 has already stored data, and part of the data is displayed on the screen of the CRT display device 9.

When a key input is performed (step 51), the main controller 2 judges what kind of key that is (step 52).

If it is found that the key is the area specifying key, it is further judged whether or not the area specifying key determines the beginning point of the area (step 53). If it determines the beginning point of the area, the position of the beginning point is stored in the area beginning point buffer 7 (step 54), and an area specifying mark indicating the beginning point of the area is displayed (step 55). If it does not specify the beginning point of the area, it is judged that the end point of the area is determined, an area specifying mark indicating the end of the area is displayed in a position where the cursor lies, and thereafter an area specifying process to define the area is performed (step 56).

At step 52, when the key is a cursor key, a move process of the cursor is performed (step 57) to judge whether or not a screen scroll should be performed (step 58).

If it is found that the screen scroll is to be performed, it is judged whether or not the line to which an area specification is executed can be put in the screen (step 59). If it cannot be put in the screen, screens divided through an automatic screen division are displayed (step 60).

When the screen scroll is not performed at step 58 and when the line to which an area specification is executed can be put in the screen, the screen is not divided but an ordinary screen is displayed (step 61).

At step 52, if the key is another key other than the area specifying key and the cursor move key, other process corresponding to the key is performed.

When the beginning point of an area is determined but the beginning point cannot be put in the screen through a screen scroll, the screen is automatically divided to always display the beginning point of the area in one of the divided screens, whereby the end point of the area can be determined, confirming a range of the area.

Additionally, only when the beginning point of an area disappears from the screen through a screen scroll, the sceen is divided, and hence the present invention is effective especially in an area specifying process in an information processing apparatus such as a Japanese word processor having a small screen.

What is claimed is:

1. An information processing apparatus having a specified-area confirming function, comprising:

input means for inputting information and marking the beginning and end points of a desired area in the information to specify the area;

inputted information storing means for storing the information inputted from said input means;

display means having a screen for displaying on the screen the information stored in said inputted information storing means;

beginning position storing means for storing the beginning position of the area specified by said input means with regard to the information displayed on the screen of said display means;

first line information storing means for storing information in the first line of the area when the area is specified by said input means;

screen dividing means for allocating a fixed screen to a predetermined position on the screen of said display means when the area is specified by said input means;

first line display means for reading the information in the first line from said first line information storing means and displaying it within the fixed screen;

scroll means for scrolling the screen of said display means when instructed from said input means; and screen division control means for controlling the screen dividing means so that the fixed screen is allocated to the predetermined position on the screen by said screen dividing means when the beginning position of the area stored in said beginning position storing means disappears from the screen of said display means due to a scroll by said scroll means.

2. An information processing apparatus in accordance with claim 1 wherein said input means includes means for moving a cursor to said beginning and end points; and means for providing a marker at said beginning and end points when said cursor is moved thereto.

* * * * *